United States Patent [19]

Meyers

[11] Patent Number: 5,039,183
[45] Date of Patent: Aug. 13, 1991

[54] HOLOGRAPHIC LASER SCANNER

[75] Inventor: Mark M. Meyers, Rochester, N.Y.

[73] Assignee: Eastman Kodak Company, Rochester, N.Y.

[21] Appl. No.: 402,308

[22] Filed: Sep. 5, 1989

[51] Int. Cl.$^5$ .......................... G02B 5/32; G02B 26/10
[52] U.S. Cl. ..................................... 359/17; 235/457; 359/19
[58] Field of Search ..................... 350/3.7, 3.71, 3.72, 350/3.75, 3.83, 417, 434, 6.91; 235/457

[56] References Cited

U.S. PATENT DOCUMENTS

| | | | |
|---|---|---|---|
| 4,289,371 | 9/1981 | Kramer | 350/3.71 |
| 4,505,537 | 3/1985 | Fenato | 350/3.71 |
| 4,623,791 | 11/1986 | Kaseko et al. | 250/234 |
| 4,712,884 | 12/1987 | Sakuma et al. | 350/434 |
| 4,747,646 | 5/1988 | Andrews | 350/3.71 |
| 4,770,517 | 9/1988 | Sakuma | 350/479 |
| 4,787,723 | 11/1988 | Uetake | 350/475 |
| 4,818,046 | 4/1989 | Kondo | 350/6.91 |
| 4,832,464 | 5/1989 | Kato et al. | 350/3.72 |
| 4,848,862 | 7/1989 | Yamazaki et al. | 350/3.71 |
| 4,873,435 | 10/1989 | Ono et al. | 350/6.91 |
| 4,904,034 | 2/1990 | Narayan et al. | 350/3.71 |

FOREIGN PATENT DOCUMENTS 59-202410  11/1984  Japan .................................. 350/417

OTHER PUBLICATIONS

Hasegawa et al., "High Resolution Holographic Line Scanner for use in Diode Laser Printers," SPIE, vol. 747, *Practical Holography II, 1987*, pp. 8–16.
Hasegawa et al., "All Holographic Line Scanner for use in Diode Laser Printers," SPIE, vol. 1136, *Holographic Optics II: Principles and Applications*, 1989, pp. 119–123.
Yamagishi et al., "Lensless Holographic Line Scanner," SPIE, vol. 615, *Practical Holography*, 1986, pp. 126–132.
Chen, "Using a Conventional Optical Design Program to Design Holographic Optical Elements," *Optical Engineering*, vol. 19, No. 5, Sep.–Oct. 1980, pp. 649–653.
Fujitsu Scientific & Technical Journal, vol. 23, No. 3, Sep. 1987, (Kawasaki, J.P.), H. Ikeda et al, "Hologram Scanner", pp. 125–144.
Patent Abstracts of Japan, vol. 8, No. 248, p. 313, (1685) Nov. 14, 1984, and JP, A, 59121371 (Nippon Denki K.K.), Jul. 13, 1984.
"Holographic Zone Plates for F-0 and Collimating Lenses," Applied Optics, vol. 25, No. 5, Mar. 1, 1986, p. 794.

*Primary Examiner*—Bruce Y. Arnold
*Assistant Examiner*—Martin Lerner
*Attorney, Agent, or Firm*—Mark Z. Dudley

[57] ABSTRACT

A light scanning system for moving a light beam across a straight surface. The system includes a laser light source, a rotating holographic disk deflection system, and a multielement Fθ lens constructed entirely of holographic plates. The holographic plates are offset from each other in the beam path and have parameters which cause the holographic plates to optically cooperate with each other to produce uniform spot size and scan velocity. Specific construction parameters and methods are outlined along with particular materials and parameter ranges.

12 Claims, 5 Drawing Sheets

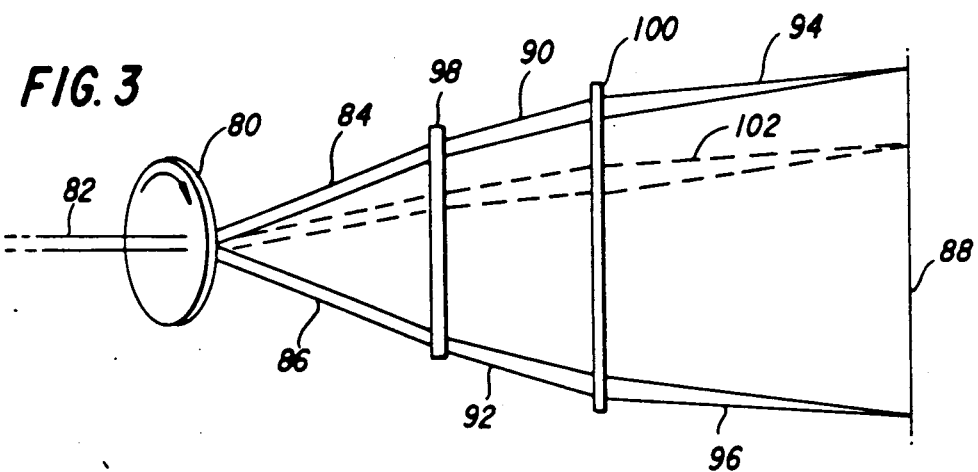
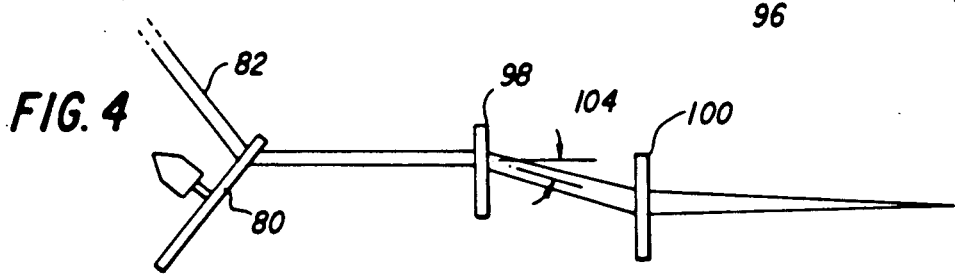
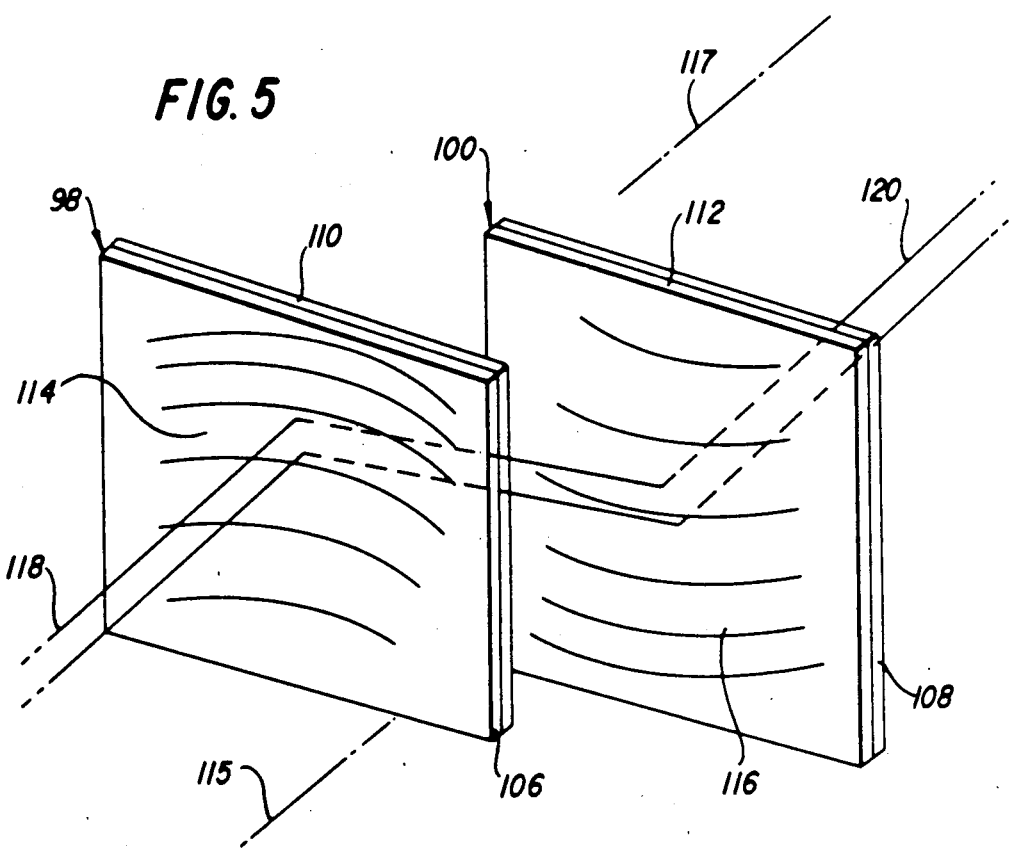

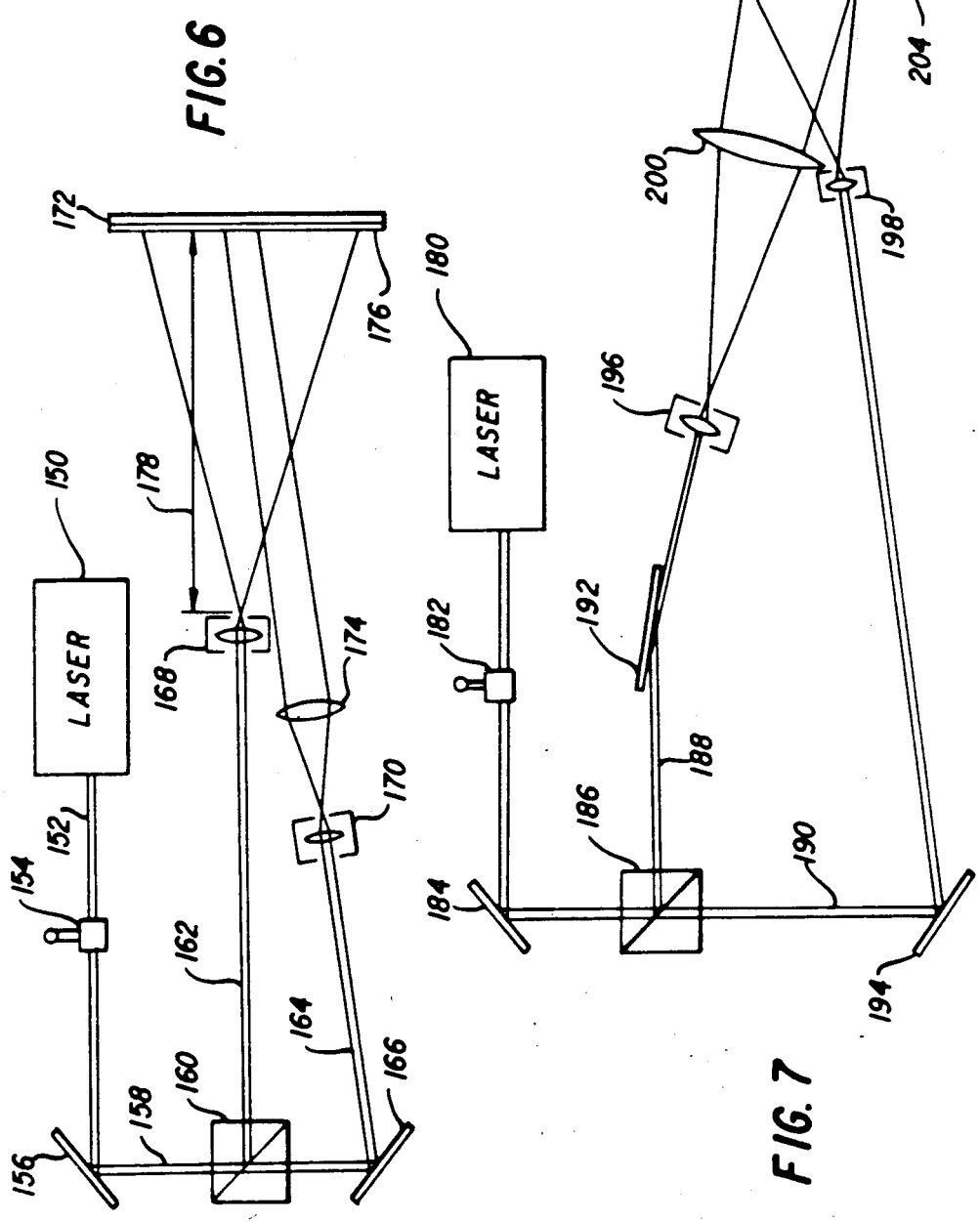

HOLOGRAPHIC LASER SCANNER

BACKGROUND OF THE INVENTION

1. Field of the Invention

This invention relates, in general, to optical printing and, more specifically, to optical systems for controlling scanned beams in electrophotographic printers and copiers.

2. Description of the Prior Art

Light beam scanning systems are used in various types of hardcopy output devices, such as copiers and printers, to form the image to be produced. Usually, a latent image is first formed on a photosensitive member by modulating the light beam as it scans across the photosensitive member. Then, the latent image is developed with toner and transferred to the hardcopy output medium, such as a sheet of paper or transparent material.

One of the difficulties in scanning a light beam across the photosensitive member is the need to correct for spot size and scan velocity uniformity. Since the photosensitive member is flat, and since the source of the light beam is substantially a fixed point in most scanners, the arc produced by deflecting the beam does not exactly follow the surface of the photosensitive member. Therefore, some type of correction is necessary. This is provided in many prior art scanners by the use of an $F\theta$ lens located in the light beam.

There are many types of $F\theta$ lenses used in light beam scanners for size and velocity compensation or correction. Many are compound lenses consisting of more than one glass lens cooperating with each other to provide the desired optical characteristics. One disadvantage of such lenses is the fact that they are rather costly and add appreciably to the overall cost of the light beam scanner. Therefore, it is desirable and an object of this invention to provide an $F\theta$ lens which can be constructed more economically than prior art $F\theta$ lenses.

One approach to economy in light beam scanners is to use holographic plates, or holograms, to deflect and diffract the light beam. Several scanners are known which use holograms for the deflecting optics of the scanner. U.S. Pat. No. 4,289,371, issued on Sept. 15, 1981, discloses a holographic deflector for a scanner. The background section of that patent identifies other references to scanners with holographic deflectors. However, from an economy standpoint, a scanner using all holograms instead of a combination of lenses, mirrors, or prisms and some holograms, or holographic optical elements (HOE's), as shown by all the prior art, is very desirable.

Limited use of HOE's in $F\theta$ lenses has provided some prior art on the subject, such as a published article in *APPLIED OPTICS*, Vol. 25, No. 5, Mar. 1, 1986, p. 794. The lenses discussed in this publication exhibit parameters which are not optimum for many scanner applications. For more sophisticated applications, the one-element holographic $F\theta$ lens of the referenced prior art does not adequately fulfill the requirements of long focal length $F\theta$ lenses. Therefore, it is also desirable to provide a scanner wherein the $F\theta$ lens is constructed of multiple holograms cooperating with each other to provide the optical parameters necessary for high-precision light beam scanners.

SUMMARY OF THE INVENTION

There is disclosed herein a new and useful light beam scanning system which uses a multiple-element $F\theta$ lens constructed entirely of holographic elements. In a specific embodiment of the invention, the scanner includes a laser light beam generator, a rotating holographic disk for deflecting the laser light beam, a bow-correcting holographic disk, and an $F\theta$ lens constructed of holographic plates. The bow corrector is positioned between the $F\theta$ lens and the rotating disk, and the $F\theta$ lens is positioned between the bow corrector and the image plane or surface upon which the scanning beam is focused.

The $F\theta$ lens consists of two parallel holographic plates containing interference patterns thereon which deflect the light beam in opposite directions. The two holographic plates cooperate with each other optically to provide a relatively long focal length for the resulting $F\theta$ lens. Both lenses are characterized by having the two optical radii for each lens different from each other by a ratio of greater than 10 to 1.

Construction specifications for specific holographic plates used in the $F\theta$ lens are disclosed herein. In addition, suitable materials for forming the holographic plates are discussed and particular parameter ranges are set forth.

BRIEF DESCRIPTION OF THE DRAWINGS

Further advantages and uses of this invention will become more apparent when considered in view of the following detailed description and drawings, in which:

FIG. 3 is a top view of a portion of the holographic laser scanner of this invention;

FIG. 4 is a side view of a portion of the holographic laser scanner of this invention;

FIG. 5 is an enlarged view of the $F\theta$ lens portion of this invention;

FIG. 6 is a diagram illustrating construction geometry which can be used to produce one of the holographic optical elements used in this invention;

FIG. 7 is a diagram illustrating construction geometry which can be used to produce another of the holographic optical elements used in this invention.

DESCRIPTION OF THE PREFERRED EMBODIMENTS

Figure 1:
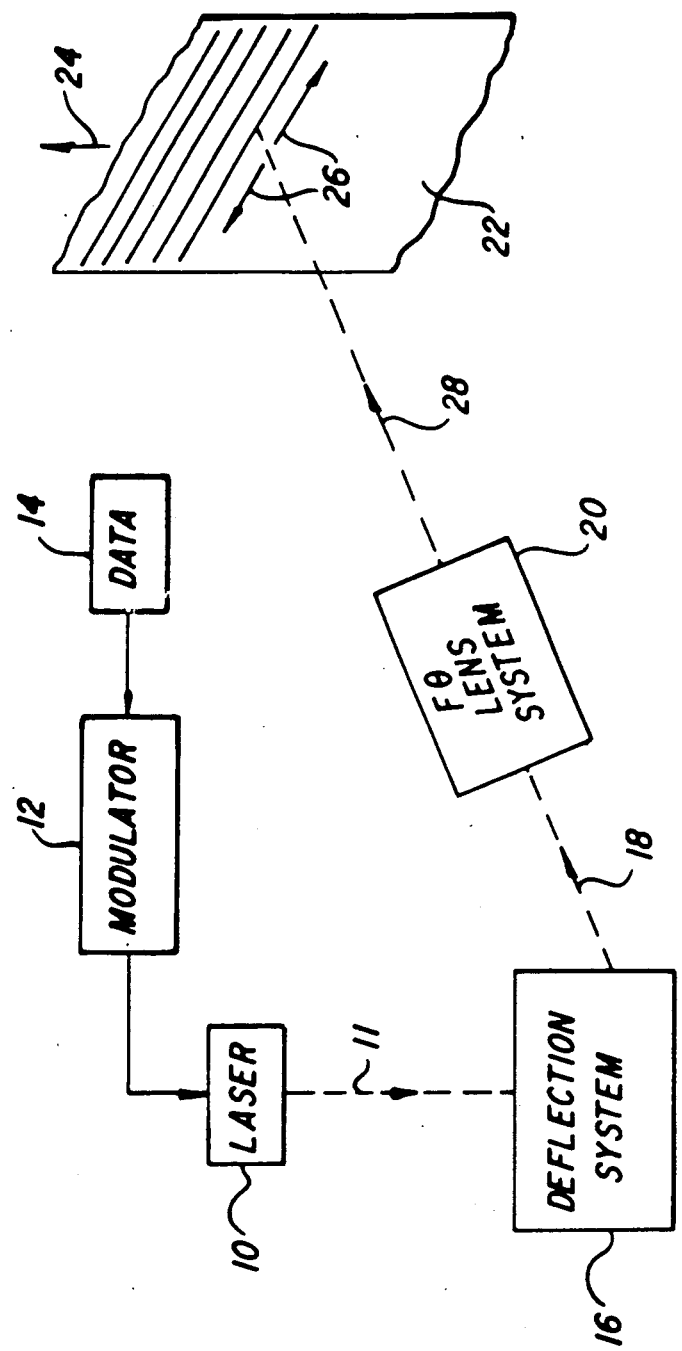
FIG. 1 is a schematic diagram of a laser printer.

Throughout the following description, similar reference characters refer to similar elements or members in all of the figures of the drawings.

Referring now to the drawings, and to FIG. 1 in particular, there is shown a schematic diagram of a laser printer illustrating the major components of such a system. A light beam 11 is generated by the laser 10 which is modulated by the modulator 12 according to the data 14 which is to be printed. The light beam from the laser 10 is acted upon by the deflection system 16 which deflects or moves the light beam in a one-dimensional direction. The deflected light beam 18 passes through an $F\theta$ lens system 20 and is focused upon a moving photosensitive member 22. Arrow 24 indicates the direction of movement of the photosensitive member 22, and arrows 26 indicate the directions of movement of the F$\theta$-corrected light beam 28 across the photosensitive member 22.

The combination of the modulated light beam 11, the movement of the photosensitive member 22, and the scanning of the light beam 28 across the photosensitive member 22 allows for image data to be formed on the photosensitive member. This image data takes the form of a latent image which can be later developed with toner and transferred to a sheet of paper or to a transparent material. Elements or components 10, 16 and 20 of the laser printer shown in FIG. 1 are the significant elements of interest in the present patent.

Figure 2:
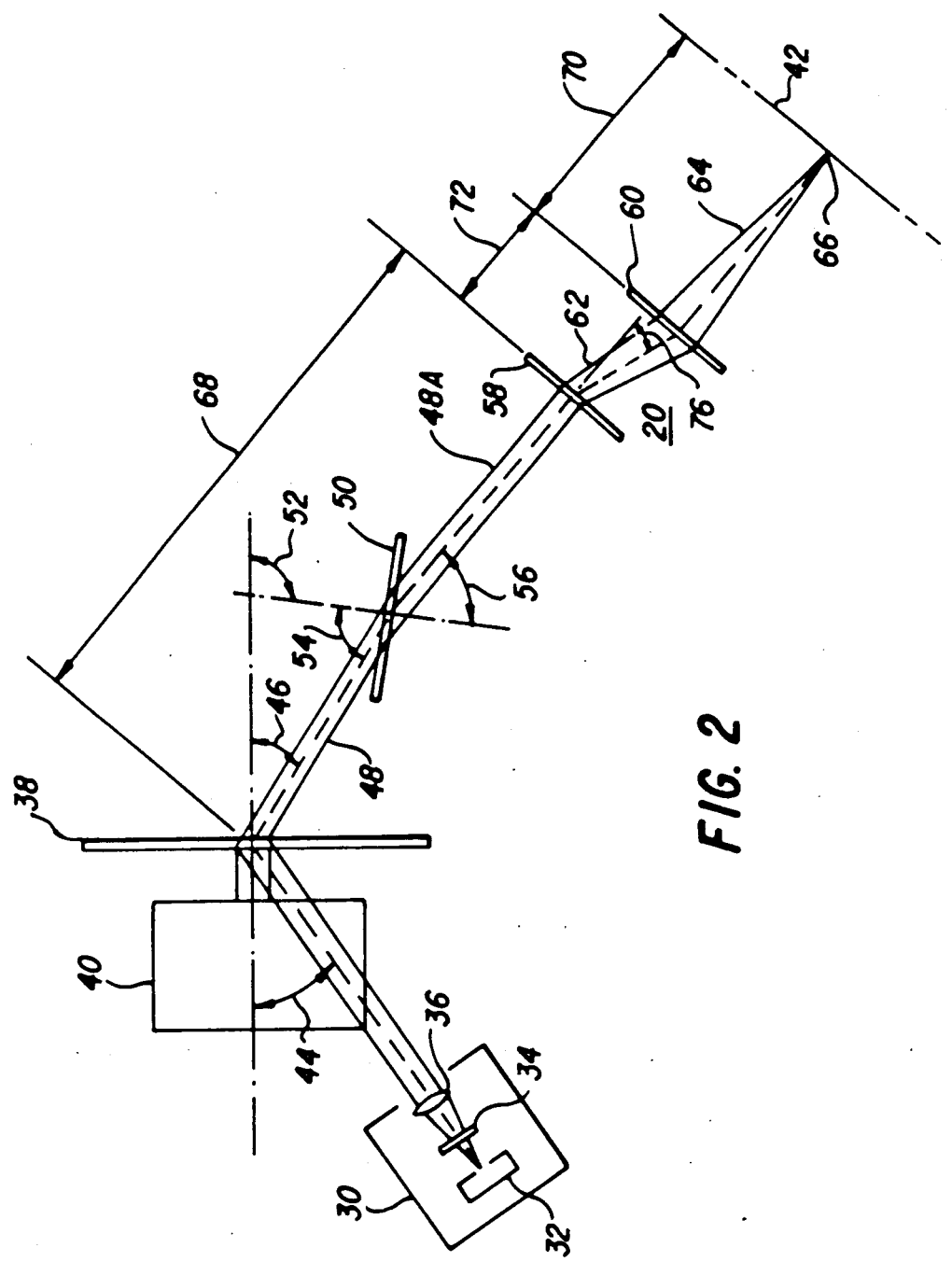
FIG. 2 is a detailed diagram of a laser beam scanner constructed according to one embodiment of the invention.

FIG. 2 is a detailed diagram of a laser scanner constructed according to one embodiment of the invention illustrating specific dimensions and angles between the various components of the system. According to FIG. 2, the light beam generator 30 includes the laser diode 32, the expander lens 34, and the collimating lens 36. The laser diode 32 operates with a light wavelength of 780 nm and is modulated according to the image data by an appropriate means.

A holographic disk 38 is rotated by the motor 40 to provide the moving deflection characteristics of the laser beam. Such rotating holographic disks are constructed of several holographic areas located at different positions around the face of the disk 38. Each holographic section can move the light beam a predetermined distance across the eventual image plane. In this specific embodiment, the holographic disk 38 deflects the laser beam 12 inches across the image plane 42. Specific parameters and construction techniques of the rotating holographic disk 38 are not included herein since these devices are well known by those skilled in the art. The specific holographic disk 38 used in this invention provides a fixed deflection of 66° in the laser beam in a direction perpendicular to the moving or scanning deflection direction. In FIG. 2, the 66° deflection is provided by angle 44 which is 33° and by angle 46 which is also 33°.

The deflected light beam 48 is, after it leaves the holographic disk 38, a parallel beam of light which is not converging or diverging. This parallel beam passes through the bow correcter 50 which is another holographic plate oriented at an angle 52 of 95° with the axis of rotation of the holographic disk 38. The light beam 48 enters the bow corrector 50 at an angle 54 of 62° and leaves the bow corrector 50 at an angle 56 of 48°. Light beam 48A also consists of parallel light rays.

The F$\theta$ lens system 20 shown in FIG. 2 consists of the holographic plates 58 and 60, which can also be referred to as holograms or holographic optical elements (HOE's). Each plate is specifically constructed with certain parameters which cause them to cooperate with each other in diffracting the light beam 48A into the light beam 62 and the light beam 64. The resulting spot 66 created on the image plane 42 is suitably focused across the entire scan distance. The hologram 58 is positioned 145 mm from the holographic disk 38, as represented by distance 68. In the other direction, the hologram 60 is positioned 644.9 mm from the image plane, which is represented by the distance 70. The distance between the two holograms 58 and 60 is 22.1 mm, which is represented by the distance 72.

The F$\theta$ lens 20 has overall parameters which provide for a focal length of 619 mm, a speed of F/70, and a scan angle of $\pm 14.3°$. The resolution provided by the F$\theta$ lens provides for a 400 dpi resolution across the 12 inch scan length at the image plane 42. As can be seen in FIG. 2, the holograms 58 and 60 are offset from each other and the deflection of the beam 62 between the two holograms is represented by the angle 76 and is equal to 15°. Light beam section 62 is characterized by the fact that it has an expanding wavefront as opposed to the parallel light beam 48A before it passed through the hologram 58. On the other hand, light beam section 64 has a converging wavefront characteristic after the beam passes through the hologram 60.

The specific holograms 58 and 60 used in this embodiment are characterized by the parameters represented below:

| Hologram 58 | |
|---|---|
| $R_1 = -8,340$ mm | Decenter $= -1361.63$ mm |
| $R_2 = +679.7$ mm | Decenter $= 0$ |
| Hologram 60 | |
| $R_3 = -9,219$ mm | Decenter $= +1362.521$ mm |
| $R_4 = -388.1$ mm | Decenter $= 0$ |

The R parameters represent the wavefront radii, or the effective distances from the exposing point sources, used in producing the holographic plates by interference pattern development from multiple light beams. The ratio of $R_1$ to $R_2$ is:

$$R_1/R_2 = -8,340/679.7 = -12.27.$$

For typical F$\theta$ lens applications, $R_1$ and $R_2$ would normally meet the following criteria:

$$R_1 > -10 R_2.$$

The ratio of $R_3$ to $R_4$ is:

$$R_3/R_4 = -9219/-388.1 = +23.75.$$

For typical F$\theta$ lens applications, $R_3$ and $R_4$ would normally meet the following criteria:

$$R_3 > 20 R_4.$$

The focal lengths of the holographic plates used in the F$\theta$ lens system with the indicated laser wavelength can be expressed as:

$$1/f_{58} = 780/488 \, (1/-8,340 - 1/679.7), \text{ or}$$

$$f_{58} = -393.5, \text{ and}$$

$$1/f_{60} = 780/488 \, (1/-9,219 - 1/-388.1), \text{ or}$$

$$f_{60} = +647.6.$$

The ratio of $f_{60}$ to $f_{58}$ is:

$$f_{60}/f_{58} = 647.6/-393.5 = -1.646.$$

For typical F$\theta$ lens applications, the ratio of focal lengths would normally meet the following criteria:
$-2.0 < f_{60}/f_{58} < -1.0.$ FIG. 3 is a top view of a portion of a holographic laser scanner constructed according to this invention with special emphasis on the F$\theta$ lens portion of the scanner. The rotating holographic disk 80 deflects the laser beam 82 between the two extreme positions illustrated by the beams 84 and 86. Although they do not occur simultaneously, the beams 84 and 86 represent the beam locations during the maximum deflections along the scan line 88 and are produced by the apparatus several times during each revolution of the disk 80. As shown in FIG. 3, the beams 90 and 92 have an expanding or diverging wavefront, and the beams 94 and 96 have a converging or contracting wavefront. The holographic plates 98 and 100 form the $F\theta$ lens of the optical system. During other portions of the scanning cycle, depending upon the position of the rotating disk 80, the light beam will be somewhere between the two light beam extremes, such as indicated by the dashed light beam 102.

FIG. 4 is a side view of the deflecting system shown in FIG. 3. The offsetting of the holographic plates 98 and 100 can be seen in FIG. 4 along with the 15° deflection produced between the holographic plates as indicated by angle 104.

FIG. 5 represents additional detail on the construction and orientation of the optical lines in the holograms 98 and 100. Each of the holographic plates is constructed of a transparent substrate material, such as 2.3 mm thick glass. The glass substrates 106 and 108 are coated with an emulsion material, such as dichromated gelatin, to form the layer in which the interference lines will be recorded. These gelatin layers are shown in FIG. 5 as layers 110 and 112 which are facing each other when the completed holograms are assembled into the orientation used for the $F\theta$ lens. The interference patterns recorded in the gelatin layers, as represented by lines 114 and 116, have different diffracting orientations as shown in FIG. 5. Lines 114 are arc segments around axis 115, and lines 116 are arc segments around axis 117, which is parallel to and offset from axis 115. This orientation permits or forces the light beam 118 to diffract downward upon passing through the plate 98 and diffract upward when passing through the plate 100. The resulting beam 120 leaving the plate 100 is substantially parallel to the arriving beam 118.

The holographic optical elements used in this invention can be formed by recording interference patterns which are produced from the combination of two laser beams emitted from two different locations. FIG. 6 illustrates the construction geometry which can be used to produce one of the holographic optical elements used in this invention. The specific dimensions and values specified are for an HOE with particular characteristics, and one which will function in the embodiments previously described herein.

According to FIG. 6, the laser 150 emits a monochromatic light beam 152 having a wavelength of 488 $\mu$m. The electronically controlled shutter 154 regulates the amount of laser light reflected by the mirror 156. The shutter 154 can be an acousto-optic device which can block the passage of light when a proper voltage is applied to the device. The reflected light beam 158 enters the beam splitter 160 and exits the beam splitter 160 in the form of two different light beams, such as light beam 162 and 164, the latter of which has been reflected from mirror 166. Spatial filters 168 and 170 project the laser beams onto the film plate 172. Focusing lens 174 is used in the lower optical path to change the diverging beam to a converging beam before the light is focused upon the film plate 172.

The film plate includes a gelatin surface 176 in which the interference pattern is exposed and recorded. This material can be dichromated gelatin, photoresist, silver bromide, or photopolymer. The spatial filter 168 and the film plate 172 are spaced by the distance 178, which in this specific embodiment is 679.7 mm. The lens 174 produces a spherical wavefront converging at 8,340 mm and directed onto the plate 172.

The tilt angle of the waves is 9.27°. Spatial filter 168 consists of a 20× microscope objective and a 10 $\mu$m diameter pinhole in the lens enclosure. Spatial filter 170 consists of a 10× microscope objective with a 25 $\mu$m diameter pinhole. Focusing lens 174 has a minimum clear aperture equal to 80.0 mm, and a focal length of 1,095 mm, although any focal length between 750 and 1,350 mm can be used.

FIG. 7 illustrates the construction geometry which can be used to produce the other of the holographic optical elements used in the $F\theta$ lens of this invention. Laser 180 has an operating wavelength of 488 $\mu$m and emits a laser beam through shutter 182, which beam is reflected from mirror 184. The beam splitter 186 divides the laser beam into the beams 188 and 190. Beam 188 is reflected from mirror 192 to provide a tilt angle of 8.41° with respect to the beam reflected from the mirror 194.

The spatial filter 196 consists of a 10× microscope objective with a 25 $\mu$m diameter pinhole. Spatial filter 198 consists of a 40× microscope objective with a 10 $\mu$m diameter pinhole opening. The focusing lens 200 has a minimum clear aperture of 98.0 mm, and a focal length of 1,295 mm, although usable focal lengths range between 750 and 1,350 mm. The focusing lens 200 produces a diverging wavefront from $-9,219$ mm which is directed toward the holographic plate 202. The interference patterns produced by both the diverging wavefront and the light beam from the spatial filter 198 are recorded in the gelatin layer 204 on the holographic plate 202.

Figure 8:
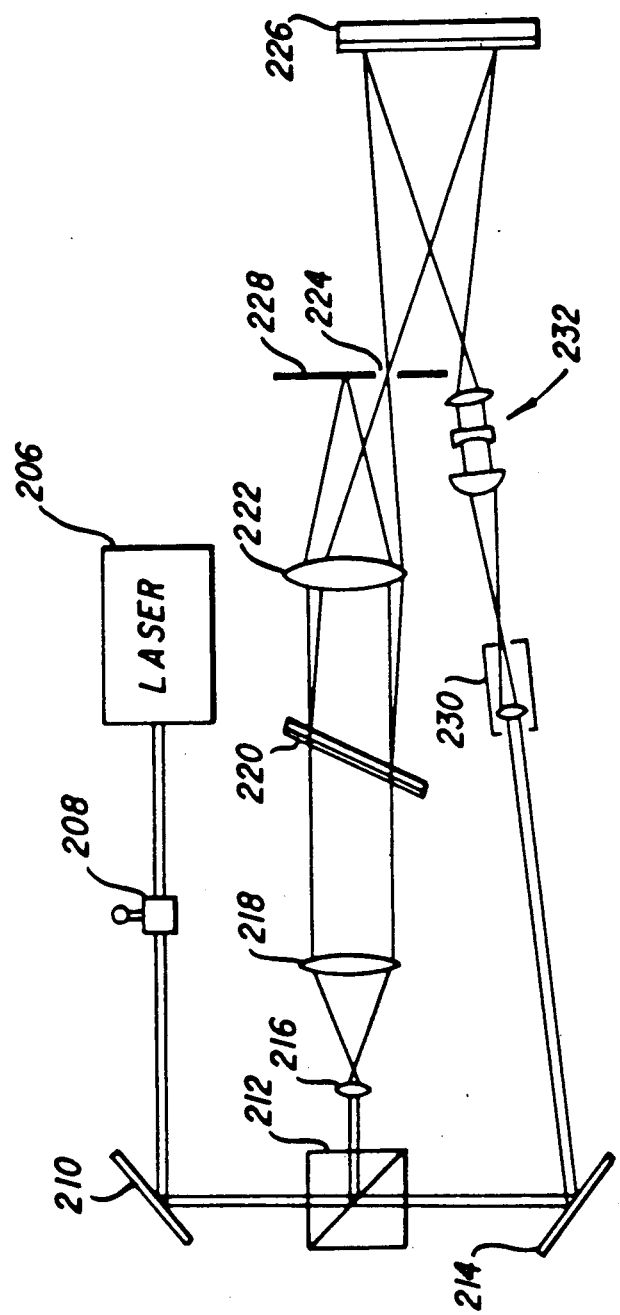
FIG. 8 is a diagram illustrating construction geometry of another technique which can be used to construct the holographic elements used in this invention.

For holographic plates having higher numerical apertures, it may be desirable to use aspheric wavefronts in the construction optics in order to produce the aspheric HOE's. This can be accomplished by using a glass lens designed specifically for this purpose or by using a computer generated hologram. FIG. 8 illustrates the construction geometry which can be used with this type of method.

According to FIG. 8, the laser 206 emits light through the electronic shutter 208, and the beam of light passing through the shutter is reflected by the mirror 210. This light beam is split by the beam splitter 212, and one of the beams is reflected by the mirror 214. Lenses 216 and 218 form a beam expander which is passed through the computer generated hologram 220. The Fourier transform lens 222 diffracts most of the light through the opening 224 and upon the film plate 226. The undiffracted light is blocked by the plate 228. The other laser beam goes through the spatial filter 230 and the custom glass lens 232 to produce a wavefront which is focused upon the film plate 226.

The unique light beam scanner system disclosed herein permits the construction of an economical scanner using all holographic elements. Sufficient $F\theta$ correction for such a scanner is provided by the multielement holographic $F\theta$ lens system. It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. A light scanning system for moving a light beam across a straight surface, said system comprising:
   a source of monochromatic light;
   means for deflecting a beam of said light in a direction which scans the light across the straight surface; and
   an Fθ lens positioned in the light beam path between the deflecting means and the straight surface, said Fθ lens including a plurality of holographic plates optically cooperating with each other.

2. The light scanning system of claim 1 wherein the light beam is converted to a beam with an expanding wavefront by a first holographic plate of the Fθ lens and the expanding light beam is converted to a beam with a converging wavefront by a second holographic plate of the Fθ lens.

3. The light scanning system of claim 1 wherein first and second holographic plates of the Fθ lens each diffract the light beam by substantially equal amounts.

4. A light scanning system for moving a light beam across a straight surface, said system comprising:
   a source of monochromatic light;
   means for deflecting a beam of said light in a direction which scans the light across the straight surface; and
   an Fθ lens positioned in the light beam path between the deflecting means and the straight surface, said Fθ lens including a plurality of holographic plates optically cooperating with each other wherein the Fr lens is characterized by the following parameter:

$-2.0 < f_1/f_2 < -1.0,$ where $f_1$ is the focal length of the first holographic plate and $f_2$ is the focal length of the second holographic plate.

5. A light scanning system for moving a light beam across a straight surface, said system comprising:
   a source of monochromatic light;
   means for deflecting a beam of said light in a direction which scans the light across the straight surface; and
   an Fθ lens positioned in the light beam path between the deflecting means and the straight surface, said Fθ lens including a plurality of holographic plates optically cooperating with each other, wherein the light beam is converted to a beam with an expanding wavefront by a first holographic plate of the Fθ lens and the expanding light beam is converted to a beam with a converging wavefront by a second holographic plate of the Fθ lens, and wherein the first holographic plate satisfies the condition that:

$R_1 > -10 R_2,$ where $R_1$ and $R_2$ are the optical radii of the two surfaces of the first holographic plate.

6. A light scanning system for moving a light beam across a straight surface, said system comprising:
   a source of monochromatic light;
   means for deflecting a beam of said light in a direction which scans the light across the straight surface; and
   an Fθ lens positioned in the light beam path between the deflecting means and the straight surface, said Fθ lens including a plurality of holographic plates optically cooperating with each other, wherein the light beam is converted to a beam with an expanding wavefront by a first holographic plate of the Fθ lens and the expanding light beam is converted to a beam with a converging wavefront by a second holographic plate of the Fθ lens, and wherein the second holographic plate satisfies the condition that:

$R_3 > 20 R_4,$ where $R_3$ and $R_4$ are the optical radii of the two surfaces of the second holographic plate.

7. A light scanning system for moving a light beam across a straight surface, said system comprising:
   a source of monochromatic light;
   means for deflecting a beam of said light in a direction which scans the light across the straight surface; and
   an Fθ lens positioned in the light beam path between the deflecting means and the straight surface, said Fθ lens including a plurality of holographic plates optically cooperating with each other, wherein the light beam is converted to a beam with an expanding wavefront by a first holographic plate of the Fθ lens and the expanding light beam is converted to a beam with a converging wavefront by a second holographic plate of the Fθ lens, and wherein the first holographic plate is characterized by the following parameters:

| | |
   |---|---|
   | $R_1 = -8340$ mm | Decenter 1 = $-1361.63$ mm |
   | $R_2 = +679.7$ mm | Decenter 2 = 0 mm | where $R_1$ and $R_2$ are the optical radii of the first holographic plate, and the decenter values correspond to the two radii of the first holographic plate.

8. A light scanning system for moving a light beam across a straight surface, said system comprising:
   a source of monochromatic light;
   means for deflecting a beam of said light in a direction which scans the light across the straight surface; and
   an Fθ lens positioned in the light beam path between the deflecting means and the straight surface, said Fθ lens including a plurality of holographic plates optically cooperating with each other, wherein the light beam is converted to a beam with an expanding wavefront by a first holographic plate of the Fθ lens and the expanding light beam is converted to a beam with a converging wavefront by a second holographic plate of the Fθ lens, and wherein the second holographic plate is characterized by the following parameters:

| | |
   |---|---|
   | $R_3 = -9219$ mm | Decenter 1 = $-1362.52$ mm |
   | $R_4 = -388.1$ mm | Decenter 2 = 0 mm | where $R_3$ and $R_4$ are the optical radii of the second holographic plate, and the decenter values correspond to the two radii of the second holographic plate.

9. A light scanning system for moving a light beam across a straight surface, said system comprising:
   means for producing a monochromatic light beam;
   means for deflecting the beam in a direction which scans the light beam across the straight surface;

a first holographic plate positioned in the light beam path between the deflecting means and the straight surface;

a second holographic plate positioned in the light beam path between the first plate and the straight surface, said first and second plates producing an optical effect which improves the linearity of the scan velocity and the uniformity of the spot size of the beam across the straight surface.

10. A light scanning system for moving a light beam across a straight surface, said system comprising:

means for producing a monochromatic light beam;

means for deflecting the beam in a direction which scans the light beam across the straight surface;

a first holographic plate positioned in the light beam path between the deflecting means and the straight surface;

a second holographic plate positioned in the light beam path between the first plate and the straight surface, said first and second plates producing an optical effect which improves the linearity of the scan velocity and the uniformity of the spot size of the beam across the straight surface, wherein:

the light beam is converted to a beam with an expanding wave front by the first holographic plate and the expanding light beam is converted to a beam with a converging wave front by the second holographic plate;

the first holographic plate satisfies the condition that:

$$R_1 > -10 R_2,$$

where $R_1$ and $R_2$ are the optical radii of the two surfaces of the first holographic plate; and the second holographic plate satisfies the condition that:

$$R_3 > 20 R_4,$$

where $R_3$ and $R_4$ are the optical radii of the two surfaces of the second holographic plate.

11. A light scanning system for moving a light beam across a straight surface oriented perpendicular to the light beam, said system comprising:

a laser source for generating a parallel, monochromatic light beam;

a rotating holographic disk, located between the laser source and the straight surface, for deflecting the beam in a direction which scans the beam across the straight surface;

a bow-correcting holographic plate located between the disk and the straight surface;

an expanding holographic plate, located in the light beam path between the bow-correcting plate and the straight surface, for converting the light beam to a beam with an expanding wavefront; and a converging holographic plate, located in the light beam path between the expanding plate and the straight surface, for converting the light beam to a beam with a converging wavefront;

said expanding holographic plate satisfying the condition that:

$$R_1 > -10 R_2,$$

where $R_1$ and $R_2$ are the optical radii of the two surfaces of the expanding holographic plate; and said converging holographic plate satisfying the condition that:

$$R_3 > 20 R_4,$$

where $R_3$ and $R_4$ are the optical radii of the two surfaces of the converging holographic plate.

12. A light scanning system for moving a light beam across a photosensitive surface oriented perpendicular to the light beam, said system comprising:

a laser source for generating a parallel, monochromatic light beam;

a rotating holographic disk, located between the laser source and the photosensitive surface, for deflecting the beam in a direction which scans the beam across the photosensitive surface; and an $F\theta$ lens positioned in the light beam path between the holographic disk and the photosensitive surface, said $F\theta$ lens including a plurality of holographic plates optically cooperating with each other.

* * * * *